Sept. 18, 1928.
H. R. RUSSON
VARIOMETER DIAL
Filed Aug. 21, 1922
1,684,972
2 Sheets-Sheet 1
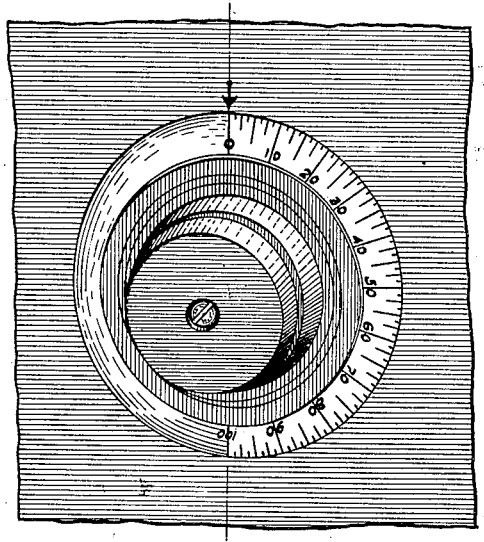
FIG. 1
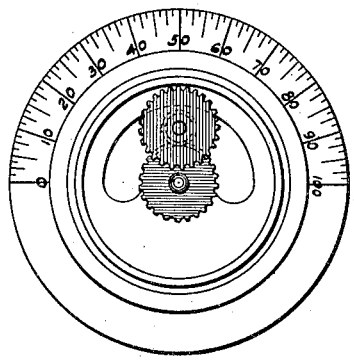
FIG. 4
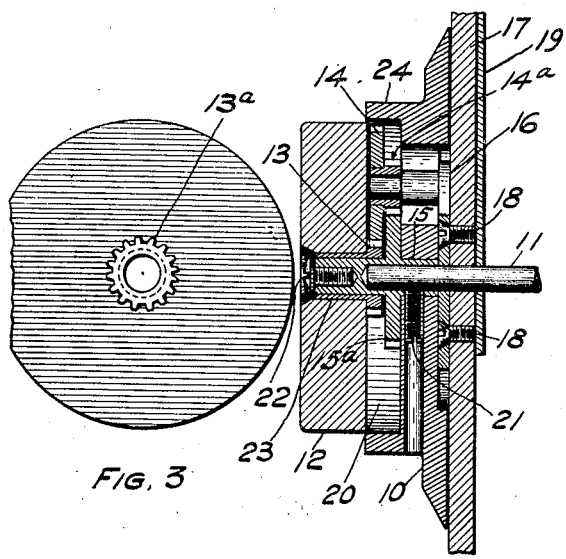
FIG. 3
FIG. 2
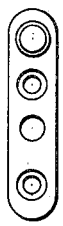
FIG. 5
INVENTORS
HARRY R. RUSSON
BY Wm C McCoy
ATTORNEY Sept. 18, 1928.
H. R. RUSSON
VARIOMETER DIAL
Filed Aug. 21, 1922
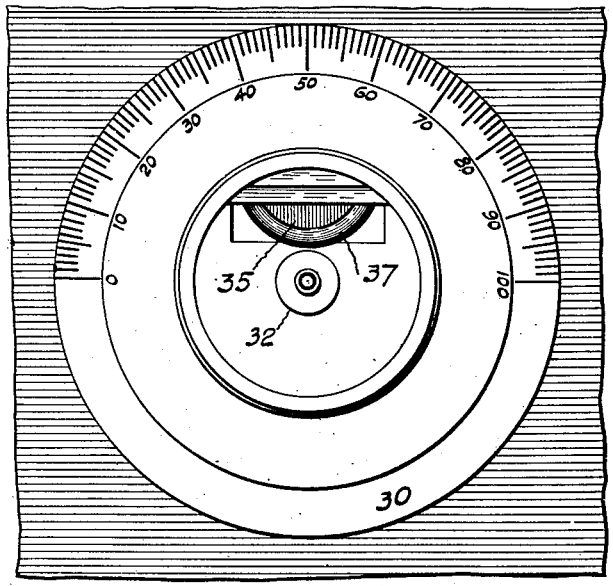
FIG. 6
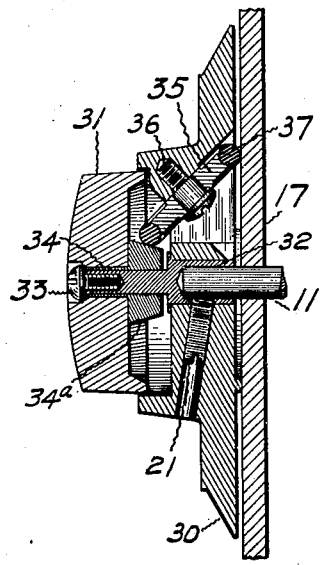
FIG. 7
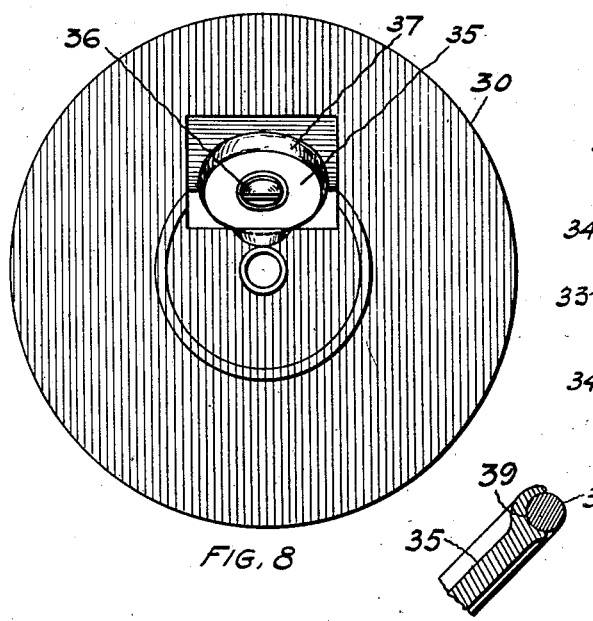
FIG. 8
FIG. 10
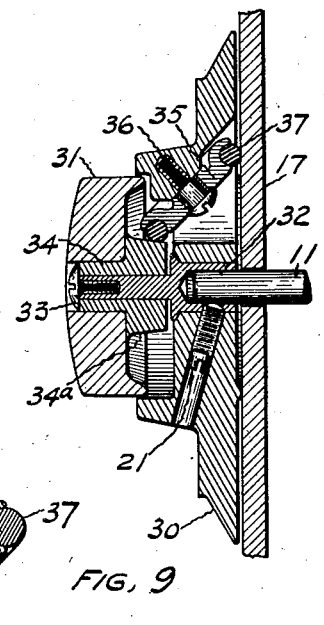
FIG. 9
INVENTOR
HARRY R. RUSSON
BY
ATTORNEY Patented Sept. 18, 1928.

1,684,972

UNITED STATES PATENT OFFICE.

HARRY R. RUSSON, OF AKRON, OHIO, ASSIGNOR OF ONE-HALF TO WILLIAM C. McCOY, OF CLEVELAND, OHIO.

VARIOMETER DIAL.

Application filed August 21, 1922. Serial No. 583,252.

My invention relates to an improved mechanism for controlling adjustable impedance devices and it is particularly directed to dials for use with wireless equipment for adjusting variometer coils or other variable impedance devices used in such apparatus.

The dials that have heretofore been proposed usually comprise a single unitary disc that is directly connected to the operating shaft of the variable impedance device. The adjustable impedance devices that are commonly used in wireless equipment are inherently of very light weight and are essentially a delicate mechanism. The adjustment of these mechanisms is particularly sensitive over certain ranges or positions of the device.

If an ordinary dial is used, the operating positions of the various impedance devices are so easily moved and inherently have such a small moment of inertia that the most careful operator will many times pass positions corresponding to desired broadcasting stations because of jerky movements of the dial or because the speed of movement of the device over the particular range in which such broadcasting station is to be found is too great to give a discernible signal of the presence of the station.

By greatly increasing the inertia of the dial, I obtain a speedy, smooth and particularly effective operation of the device over its entire range. Such a dial does not require the intense attention of the operator that is demanded by the ordinary dial, and broadcasting stations within the range of the apparatus are far more easily located.

An additional advantage of my device is that a supplemental knob that is mounted concentrically with the main dial is employed to increase the inertia of the operating part, and this knob also constitutes a vernier adjustment that enables the operator to obtain sufficiently close adjustment of the main variometer coil without using the supplemental coil that is ordinarily demanded. The range of movement of impedance coils is usually one-half turn or about 180° for the complete range of the instrument. If a supplemental knob, such as I provide, with a speed ratio of about eight to one is used, the range of the instrument is then covered by moving the knob around four times in contrast with the one-half turn of the main dial that is customary with previously proposed dials.

An additional advantage that is inherent in my device is that after the variometer coil is once adjusted, there is no unintended movement of the adjusting mechanism. It is a very common experience to have a perfect adjustment of a receiving set lost during an important demonstration because the position of the variometer coil changed from a jar or because it was poorly balanced. When my improved dial is employed, such perfect balance of the operating parts is not required.

My device can furthermore be placed on any wireless sending or receiving outfit without material alteration of the equipment and generally by a mere substitution of dials without any modification whatsoever in the remainder of the equipment.

Broadly, my invention, as I have reduced it to practice, constitutes a main dial and a concentric vernier dial that operates the main dial and therefore the variometer coil in accordance with a desirable gear reduction.

In the accompanying drawings:

Fig. 1 is a perspective view of a dial constructed in accordance with my invention and mounted on the insulating panel of a wireless instrument of conventional design;

Fig. 2 is a sectional elevational view taken substantially on line 2—2 of Fig. 1;

Fig. 3 is a rear elevational view of the supplemental adjusting knob that is employed in my invention;

Fig. 4 is a front elevational view of the main dial and the reducing gears, the supplemental knob having been removed;

Fig. 5 is a view in perspective of a bracket that constitutes a part of the device;

Fig. 6 is a front elevational view, with the supplemental knob removed, of a modified form of my invention;

Fig. 7 is a sectional elevational view taken substantially on line 7—7 of Fig. 6; and Fig. 8 is a rear elevational view of the dial shown in Fig. 6;

Fig. 9 is a sectional elevational view of a modified form of the dial shown in Fig. 7; and Fig. 10 is a detailed sectional elevational view of a friction drive wheel shown in Fig. 9.

The form of my improved dial that is illustrated in Figs. 1 to 5 of the drawings, comprises a main dial 10 that is rigidly connected to a variometer, or other adjustable impedance device my means of the shaft 11. It is not deemed necessary to show more than the shaft of the impedance device because of its familiar character. A supplemental adjusting knob 12 is rotatably connected to the shaft 11 and is operably connected to the main dial 10 through a train of gears 13ª, 14, 14ª and 15ª, certain of which constitute parts of gear bushings 13 and 15. A bracket 16, that is secured to an insulating panel 17 of the receiving apparatus by means of suitable screws 18, serves to pivotally support the idler gear 14. A ground shield 19 is secured to the panel 17 in accordance with customary practice. The dial 10 has an aperture 10ª formed therein to permit the free rotation of the dial about the bracket 16 after the bracket is mounted on the insulating panel 17. The front portion of the main dial 10 has a chambered portion 20 that is of sufficient size to house the train of gears.

The outermost end of the operating shaft 11 is secured to the main dial 10 by means of a set screw 21 that is threaded into the gear bushing 15. This gear bushing 15 is molded or otherwise rigidly mounted in the dial 10. The outermost end of the gear bushing 15 is threaded to receive an assembly screw 22 that serves to rotatably mount the adjusting knob 12 on the end of the gear bushing 15. The gear bushing 13 is molded into the knob 12. The inner portion of the gear bushing 13 has the gear wheel 13ª formed thereon, and the outermost portion of the gear bushing 15 has the gear wheel 15ª formed thereon. The gear member 14 comprises a large diameter gear wheel that meshes with the gear wheel 13ª, and a small diameter gear wheel 14ª that meshes with the gear wheel 15ª. These wheels are rigidly connected and form the unitary member 14. The outer shouldered portion of the bracket 16 functions as a bearing for free rotational movement of the idler gear 14 thereon. Screws 18 rigidly secure the bracket 16 to the panel 17.

The rough adjustment of the receiving set, in order to locate broadcasting stations, is made by grasping the knurled surface 24 of the main dial 10 and turning the dial 10 through its range of movement.

The movement of the main dial 10 causes the adjusting knob 12 to rapidly spin on its journal 22 and thereby limit the rate and quality of movement of the dial 10 to a uniform motion that would not be possible if the inertia of the rapidly rotating dial 12 were not added to the very low inertia of the remainder of the adjusting mechanism. This rotational movement of the knob 12 is transmitted from the main dial 10 through the gear bushing 15 and idler gears 14 and 14ª to the gear bushing 13 of the supplemental knob. Since the shouldered end of the bracket 16 is rigidly held in place relative to the panel 17, any movement of the dial 10 must cause a corresponding movement of the knob 12, the extent of which is determined by the gear ratio.

After the rough adjustment of the dial 10 is made in the above-indicated manner, finer adjustments of the variometer are effected by turning the knob 12. Since the gear ratio between the dial 10 and the knob 12 is sufficiently large to produce only a relatively small movement of the dial 10 when the knob 12 is rotated through a considerable movement, it has been found unnecessary to use a supplemental adjusting variometer, usually called a "vernier coil" in a machine equipped with my improved dial.

The principle of increasing the inertia of the rotating part of the adjusting mechanism in a receiving set materially increases the effectiveness of its operation, and it enables sufficiently fine adjustments to be obtained with the single variometer mechanism without resorting to the use of supplemental equipment for obtaining small gradations after the setting of the main variometer coil is established. Furthermore, my device enables the operator to more readily detect broadcasting stations, since the inertia of the device limits the speed of movement of the main dial to a uniform motion instead of the jerky and erratic movement that is obtained with the dials now in use.

The modified form of dial shown in Figs. 6 to 8 inclusive, comprises a graduated dial 30 that is rigidly secured to the shaft 11 of an adjustable impedance device (not shown) and thereby rotatably mounted on the panel 17. A set screw 21 serves to secure the dial to the shaft. A knob 31 is rotatably mounted on a bushing 32 that is rigidly secured to the dial 30 by means of a screw 33 that enters the outer end of the bushing 32. The knob also has a bushing 34 that is rigidly secured within the knob and that has a portion 34ª that extends beyond the inner face of the knob. The surface of the portion 34ª is knurled or otherwise roughened to provide a suitable bearing surface for the friction tread wheel 35.

The dial 30 is apertured to receive the wheel 35 that is mounted therein on an inclined plane in such manner as to engage the knob and the panel. The shouldered screw 36 forms a bearing for the wheel 35. A resilient tread 37 is provided on the wheel for increasing its tractive contact.

Figs. 9 and 10 show a modified form of the inclined friction wheel and the method of securing the tread member 37 thereto. In this instance the wheel is inclined at substantially the same angle to the panel 17 and the tread portion 34ª of the knob bushing. The pressure against the center of the wheel is therefore in alignment with its axis which insures smooth operation.

A resilient tread band 38 is mounted in a peripheral groove 39 in the face of the wheel and cemented in place. This groove is formed at an angle of substantially forty-five degrees with the plane of the wheel in order that all pressure on the tread may be effectively resisted by the sidewalls of the groove. This also prevents lateral rolling of the tread band from the wheel and provides uniform bearing pressure at the center of the wheel.

One of the big advantages of the last named type of dial is the ease with which it may be mounted on the machine. The only thing that is necessary is to remove the customary dial from the shaft of the impedance device, and mount my improved dial thereon by tightening the set screw 21. In the first type of dial, the bracket 16 must first be mounted on the panel, the dial 10 and gear wheels 14 and 15 then placed in position and the knob 12 secured in place.

Although I have described only a few applications of the principles of my invention to an adjusting dial for wireless apparatus, the invention is obviously of broader scope than any particular design and I desire that only such limitations shall be imposed as are indicated in the accompanying claims.

What I claim is:

1. An apparatus comprising a panel, a dial rotatably mounted thereon, a bracket mounted on said panel and extending through an aperture in said dial, an idler gear wheel mounted on said bracket, a gear wheel rigidly mounted on said dial and adapted to mesh with said idler gear, and a knob rotatably mounted on the dial and having a gear wheel adapted to mesh with said idler gear.

2. An apparatus comprising a panel, a dial rotatably mounted thereon, a bracket mounted on said panel and extending through an aperture in said dial, an idler gear wheel mounted on said bracket, a gear wheel rigidly mounted on said dial and adapted to mesh with said idler gear, and a knob rotatably mounted on the dial and having a gear wheel adapted to mesh with said idler gear, said gears and said bracket being completely housed within said dial and knob.

3. An apparatus comprising a panel, a dial rotatably mounted on said panel, a knob concentrically mounted on said dial, a bracket secured to said panel and extending through an aperture in said dial, an idler gear wheel rotatably mounted on said bracket and adapted to engage said knob and said dial.

4. A mechanism comprising a main dial, a gear-toothed bushing carried by the main dial, an adjusting knob having gear teeth thereon rotatably mounted on said bushing, and a gear train interposed between the gear toothed portion of the knob and the gear toothed portion of the bushing.

5. A mechanism comprising a main dial, a gear-toothed bushing carried by the main dial, an adjusting knob having gear teeth thereon rotatably mounted on said bushing, a panel on which said dial is rotatably mounted, a bracket rigidly mounted on said panel and extending through an opening in said dial, and a gear wheel mounted on said bracket and adapted to permanently mesh with said toothed bushing and with the gear teeth of said knob.

6. In combination, an operating shaft for an adjustable device, two adjusting members therefor co-axial with each other and rotatable relatively to each other, one of said adjusting members being axially on one side of the other adjusting member, and a speed-reducing connection interconnecting one of said adjusting members to the other and including a part projecting through one of said adjusting members from the axial side on which said other adjusting member is located to the other axial side for co-operation with a stationary member.

7. In radio apparatus tuning mechanism, an element to be adjusted to obtain the desired tuning effect, an adjusting knob or handle manually operable to move the element from one position to another, supported by said element, means whereby the handle is held against axial adjustment and is held against axial displacement relatively to said element, and instrumentalities having a plurality of longitudinal and parallel and fixed axes of rotation including a center pinion rigid with said handle and removable therewith and operative by quick rotation of said knob to very slowly rotate said element, in either direction at will, whereby said knob and element always rotate in the same direction, about the axis of said mechanism, but with such fixed and unchangeable ratio of speed that the knob can rotate a plurality of times in said position thereof while said element is making only a partial rotation, and whereby quick rotation of the knob will turn said element so slowly that it can be stopped at will in any position thereof necessary for accurately tuning said apparatus, and removal of said handle being sufficient to permit access to said instrumentalities without disturbing said shaft.

8. In radio apparatus tuning mechanism, an element to be adjusted to obtain the desired tuning effect, an adjusting knob or handle manually operable to move the element from one position to another, supported by said element, means whereby the handle is held against axial adjustment and is held against axial displacement relatively to said element, and instrumentalities having a plurality of longitudinal and parallel and fixed axes of rotation including a center pinion rigid with said handle and removable therewith and operative by quick rotation of said knob to very slowly rotate said element, in either direction at will, whereby said knob and element always rotate in the same direction, about the axis of said mechanism, but with such fixed and unchangeable ratio of speed that the knob can rotate a plurality of times in said position thereof while said element is making only a partial rotation, and whereby quick rotation of the knob will turn said element so slowly that it can be stopped at will in any position thereof necessary for accurately tuning said apparatus, and removal of said handle being sufficient to permit access to said instrumentalities without disturbing said shaft, said element to be adjusted comprising a radio instrument shaft, and means whereby said shaft is limited to less than a complete rotation in either direction, but said knob or handle being capable of several rotations in either direction about the axis of said instrument, and being capable of stopping in different positions with practically an imperceptible variation in the predetermined position in which it is desired to stop said shaft, so that stopping of said knob or handle in exact position is not necessary.

9. In radio apparatus tuning mechanism, an element to be adjusted to obtain the desired tuning effect, an adjusting knob or handle manually operable to move the element from one position to another, supported by said element, means whereby the handle is held against axial adjustment and is held against axial displacement relatively to said element, and instrumentalities having a plurality of longitudinal and parallel and fixed axes of rotation, including a center pinion rigid with said handle and removable therewith and operative by quick rotation of said knob to very slowly rotate said element in either direction at will whereby said knob and element always rotate in the same direction, about the axis of said mechanism, but with such fixed and unchangeable ratio of speed that the knob can rotate a plurality of times in said position thereof while said element is making only a partial rotation, and whereby quick rotation of the knob will turn said element so slowly that it can be stopped at will in any position thereof necessary for accurately tuning said apparatus, and removal of said handle being sufficient to permit access to said instrumentalities without disturbing said shaft, comprising indicating means operable in a fixed plane back of the fixed plane of rotation of said knob, adapted to rotate in unison with the element to be adjusted, to provide visible indicating means for enabling the operator to stop the motion of said element at will in any position thereof.

10. In radio apparatus tuning mechanism, an element to be adjusted to obtain the desired tuning effect, a removable adjusting knob or handle manually operable to move the element from one position to another, and instrumentalities having a plurality of longitudinal and parallel and fixed axes of rotation including a sleeve by which said handle is supported on said element and means engaging said sleeve and entirely concealed back of the fixed position of operation of said handle, accessible by merely removing said handle and operative by quick rotation thereof to very slowly rotate said element, in either direction at will, said knob and element always rotating in the same direction, about the axis of said mechanism, but with such ratio of speed that the knob can rotate a plurality of times while said element is making only a partial rotation, whereby quick rotation of the knob will turn said element so slowly that it can be stopped at will in any position thereof necessary for accurately tuning said apparatus.

11. In radio apparatus tuning mechanism, an element to be adjusted to obtain the desired tuning effect, a removable adjusting knob or handle manually operable to move the element from one position to another, and instrumentalities having a plurality of longitudinal and parallel and fixed axes of rotation including a sleeve by which said handle is supported on said element and means engaging said sleeve and entirely concealed back of the fixed position of operation of said handle, accessible by merely removing said handle and operative by quick rotation thereof to very slowly rotate said element, in either direction at will, said knob and element always rotating in the same direction, about the axis of said mechanism, but with such ratio of speed that the knob can rotate a plurality of times while said element is making only a partial rotation, whereby quick rotation of the knob will turn said element so slowly that it can be stopped at will in any position thereof necessary for accurately tuning said apparatus, said element to be adjusted comprising a radio instrument shaft extending into said concealed instrumentalities and said plane of rotation, and means whereby said shaft is limited to less than a complete rotation in either direction, but said knob or handle being capable of several rotations in either direction, and being capable of stopping in different positions with practically an imperceptible variation in the predetermined position in which it is desired to stop said shaft, so that stopping of said knob or handle in exact position is not necessary.

12. In radio apparatus tuning mechanism, an element to be adjusted to obtain the desired tuning effect, a removable adjusting knob or handle manually operable to move the element from one position to another, and instrumentalities having a plurality of longitudinal and parallel and fixed axes of rotation including a sleeve by which said handle is supported on said element and means, engaging said sleeve and entirely concealed back of the fixed position of operation of said handle, accessible by merely removing said handle and operative by quick rotation thereof to very slowly rotate said element, in either direction at will, said knob and element always rotating in the same direction, about the axis of said mechanism, but with such ratio of speed that the knob can rotate a plurality of times while said element is making only a partial rotation, whereby quick rotation of the knob will turn said element so slowly that it can be stopped at will in any position thereof necessary for accurately tuning said apparatus, in which said element is rotatable about the axis of said handle or knob, and including means whereby axial displacement of the handle or knob is possible when necessary, without disturbing said element, by removal therewith of part of said instrumentalities.

13. In radio apparatus, the combination of the following three elements, to-wit: (1) a radio instrument shaft to be adjusted for tuning purposes; (2) a rotary knob or handle for manual rotation to rotate said shaft, held against axial adjustment relatively to said shaft; (3) intermediate instrumentalities having a plurality of longitudinal and parallel and fixed axes of rotation including a center pinion rigid with said handle, whereby said shaft will always rotate slower than the knob or handle, whereby the handle may rotate freely and quickly in either direction, several times, while the shaft is rotating only partially very slowly; and (4) means whereby said handle is removable to permit access to said instrumentalities without disturbing said shaft.

14. In radio apparatus, the combination of the following three elements, to wit: (1) a radio instrument shaft to be adjusted for tuning purposes; (2) a rotary knob or handle for manual rotation to rotate said shaft, held against axial adjustment relatively to said shaft; (3) intermediate instrumentalities having a plurality of longitudinal and parallel and fixed axes of rotation including a center pinion rigid with said handle, whereby said shaft will always rotate slower than the knob or handle, whereby the handle may rotate freely and quickly in either direction, several times, while the shaft is rotating only partially very slowly; and (4) means whereby said handle is removable to permit access to said instrumentalities without disturbing said shaft, in combination with (5) indicating means always movable slower than the handle and in the same direction to show the speed of rotation and the exact position of said shaft.

In witness whereof, I have hereunto signed my name.

HARRY R. RUSSON.